United States Patent [19]

Leger et al.

[11] 4,410,282

[45] Oct. 18, 1983

[54] APPARATUS FOR CONTINUOUS AND DIRECT MEASUREMENT OF THE SEA SURFACE TEMPERATURE

[75] Inventors: Guy Leger, Monaco, Monaco; Jacques Roux, Aix-en-Provence; Jean Alinat, Nice, both of France; Jacques Constans, Monaco, Monaco

[73] Assignee: European Atomic Energy Community, Luxembourg

[21] Appl. No.: 262,704

[22] Filed: May 11, 1981

[30] Foreign Application Priority Data

May 9, 1980 [GB] United Kingdom ............... 8015401

[51] Int. Cl.³ .......................... G01K 1/14; G01K 1/16
[52] U.S. Cl. ..................................... 374/156; 73/292; 73/322.5
[58] Field of Search ............ 73/353, 344, 291, 170 A, 73/292, 308; 441/11, 32; 374/156, 142

[56] References Cited

U.S. PATENT DOCUMENTS

| | | | |
|---|---|---|---|
| 2,040,292 | 5/1936 | Brown | 374/136 |
| 2,282,277 | 5/1942 | Whittier | 374/136 |
| 3,273,393 | 9/1966 | Spark | 73/136 |
| 3,561,267 | 2/1971 | Costello | 374/136 |
| 3,587,309 | 6/1971 | Jasperson | 73/170 A |
| 3,596,512 | 8/1971 | Bixby | 73/170 A |
| 3,670,572 | 6/1972 | Devereux et al. | 73/170 A |
| 3,674,225 | 7/1972 | Johnson | 441/11 |
| 4,030,361 | 6/1977 | Fortune | 374/136 |
| 4,123,813 | 11/1978 | Adams | 441/11 |
| 4,228,556 | 10/1980 | Searls | 441/11 |

FOREIGN PATENT DOCUMENTS 2330410 6/1977 France ............................. 374/183

OTHER PUBLICATIONS

Electrical Communication, vol. 47, No. 4, 1972, pp. 264–270 (London), "Lightweight Buoy L55 for Oceanographic . . . Measurements", by Vitureau et al.

Primary Examiner—Daniel M. Yasich
Attorney, Agent, or Firm—Stevens, Davis, Miller & Mosher

[57] ABSTRACT

An apparatus for the continuous and direct measurement of the temperature of the upper superficial layer of the surface of the sea or other water surface, which apparatus comprises a central floating member and at least one arm connecting the central member to at least one peripheral floating element, the or each arm containing a thermal collector for transmitting heat to at least one temperature detector carried by the apparatus, wherein the central member and the peripheral floating element are adapted to maintain the apparatus on the water surface while at least a part of the or each arm is in contact with and senses the upper superficial layer of the water, and wherein electrical means are provided in the apparatus for the storage and/or transmission of temperature data from the or each temperature detector.

12 Claims, 5 Drawing Figures

APPARATUS FOR CONTINUOUS AND DIRECT MEASUREMENT OF THE SEA SURFACE TEMPERATURE

BACKGROUND OF THE INVENTION

1. Field of the Invention

The present invention relates to an apparatus for the continuous and direct measurement of the temperature of the sea in its upper superficial part.

The temperature of the surface of a lake or other water surfaces may also be directly detected with such apparatus.

2. Prior Art

One method used in practice for the detection of a water surface temperature is infrared radiometry, but by this means only the remote temperature of the external face of the water is measured. Such a measurement may not be considered to be exact owing to the reflection of sun light, the atmospheric layer to be traversed, possible fog, etc. Other sea water surface measurements being carried out in practice only measure the average temperature of the first half meter of water.

A knowledge of the thermal exchange between water and the atmosphere across the upper thin ultra superficial layer of water, whose thickness is of the order of a fraction of a millimeter, is very important and the precision of the measurement must be at least of the order of $10^{-1}°$ C.

Various sea surface temperature measuring apparatuses are known—see, for example, U.S. Pat. Nos. 3,670,572 and 3,596,512 and French Pat. No. 2,330,410—but these are generally not adapted to measure specifically the temperature of the upper superficial layer of a water surface, which is particularly important for the infrared teledetection of temperature.

SUMMARY OF THE INVENTION AND OBJECTS

An important feature of the present invention is that the apparatus is adapted to lie on the water surface so that the sensing portion thereof contacts the upper superficial layer of the water.

The object of the present invention is the realization of a temperature detector which is light, flexible, highly buoyant and able to follow the micromovements of the water surface without leaving the ultra surface of the water. It is understood that once a certain sea state is exceeded, the surface layer of water is replaced by a mixed layer of a given thickness, and that then the temperature of this layer can be measured by conventional means, such as a normal or reversing thermometer. Owing to the fact that its use is desirably continuous (i.e. uninterrupted), the detector should not be fragile and should chemically resist, for its nature and structure, hydrocarbons and other pollutants. It should not be affected in its structure by sun rays in the measurement of temperature. The length of the detector should be sufficient to give it a degree of flexibility without losing contact with the water surface. It should also be freely deformable and present the minimum resistance to wind and wave. It should also be operational after a storm.

In accordance with the present invention there is provided an apparatus for the continuous and direct measurement of the temperature of the upper superficial layer of the surface of the sea or other water surface, which apparatus comprises a central floating member and at least one arm connecting the central member to at least one peripheral floating element, the or each arm containing a thermal collector for transmitting heat to at least one temperature detector carried by the apparatus, wherein the central member and the or each peripheral floating element are adapted to maintain the apparatus on the water surface while at least a part of the or each arm is in contact with and senses the upper superficial layer of the water, and wherein electrical means are provided in the apparatus for the storage and/or transmission of temperature data from the or each temperature detector.

The extremities of the detector are well adapted to exploit the phenomena of the surface tension between the water and the material constituting the extremities, and its essential field of temperature measurement concerns the ultra superficial layer of the water surface.

In one embodiment, the present apparatus, is freely connected to a buoy at a distance of at least 1 or 2 meters and follows its drifting movements. An interlaced hollow nylon cable forming the mechanical connection between the two also carries electrical connections from the apparatus to the buoy.

The apparatus of the present invention, when connected to and dragged by a drifing buoy, transmits the temperature signals to the said buoy. From the buoy, temperature data are transmitted to a terrestrial station, to a ship, to a rig or a platform, or to a satellite where they are then correlated with remote infrared radiometric measurements.

In another embodiment of the present invention, the present apparatus can operate independently of any buoy by including therein means for converting the temperature data received from its detector(s) into signals to be transmitted telegraphically to a receiving station. Currently this means would comprise a microprocessor, microbattery and microemitter, and would be preferably located in the central floating member.

Since the present apparatus is designed to gather information concerning the thermal exchange between a water surface and its local atmosphere, it is often desirable to include in the apparatus means for detecting the temperature of the air immediately above the surface of the water being sensed, and also the temperature of the water at a level below this superficial surface. Suitable detectors for these purposes can be incorporated conveniently in the central floating member.

BRIEF DESCRIPTION OF THE DRAWINGS

Two embodiments of the present invention will now be described with reference to the accompanying drawings, in which.

DETAILED DESCRIPTION OF THE DRAWINGS

Figure 1:
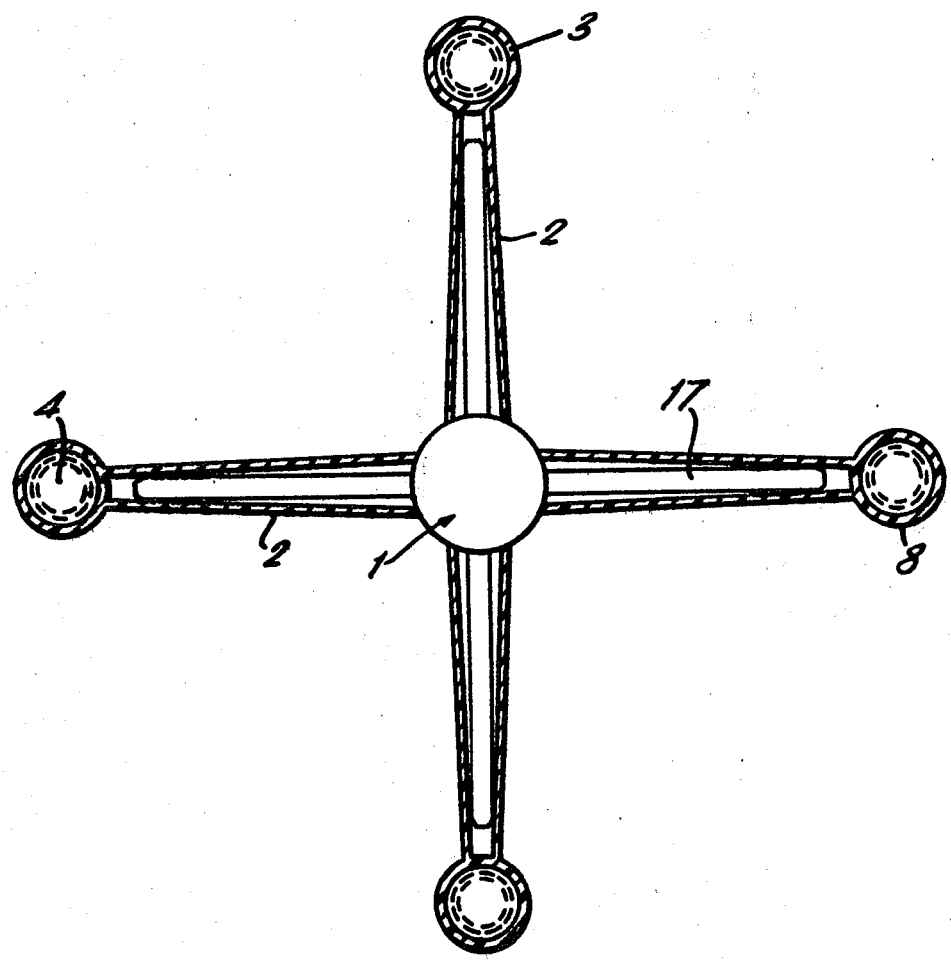
FIG. 1 shows a temperature detecting apparatus of the present invention adapted to be attached to a buoy.
Figure 4:
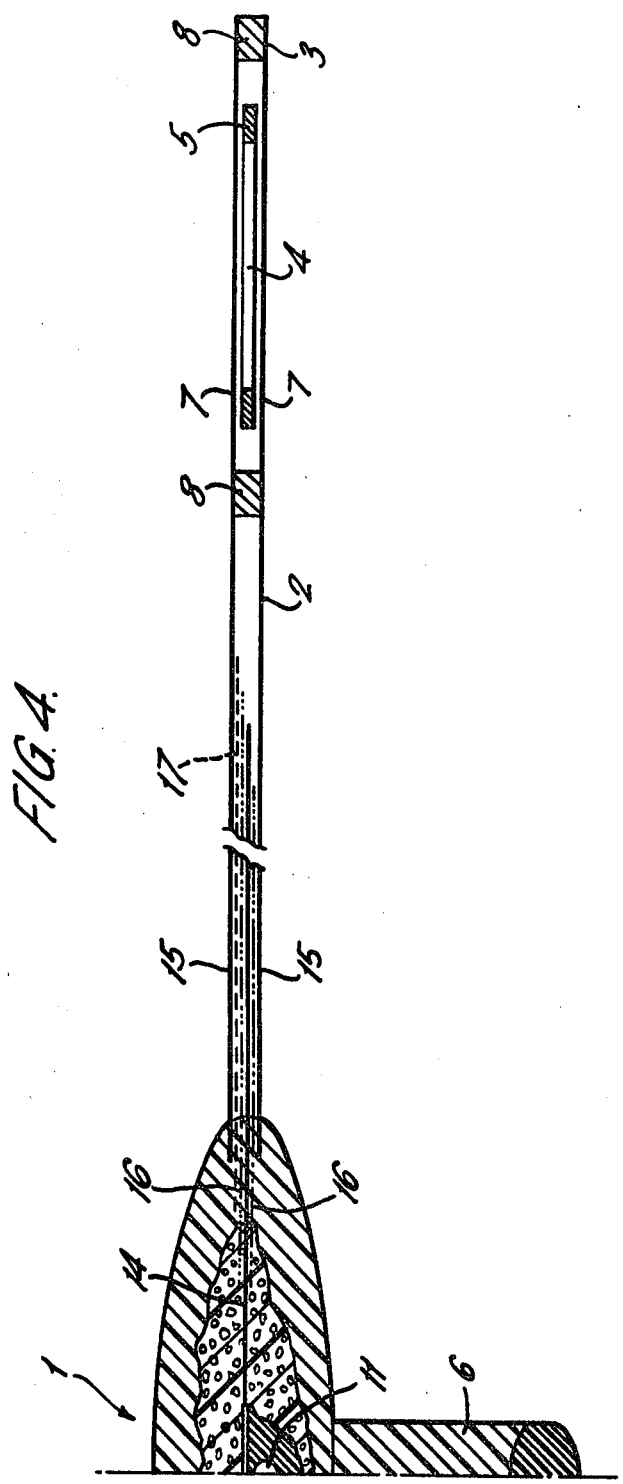
FIG. 4 shows diametrically and partially in section to a greater scale, a side view of one arm of the detector of FIG. 1.

In FIG. 1, the central floating member 1 is connected via four arms 2 to four peripheral floating elements 3. These peripheral floating elements, preferably of a circular form, and having a thickness of some fractions of a millimeter, include a volume 4 of air which, in the embodiment of FIG. 4 is obtained by a washer 5 made of P.V.C. The floating elements 3 are constituted by two plastics discs 7 circumferentially soldered together, as seen in 8 of FIGS. 1 and 4. The washer prevents the discs from being in contact and always preserves a small volume of air between them which provides an upthrust for element 3 and increases the adherence to the water surface for the relative extension of the disc 7 and to the enlarged surface tension.

In another embodiment, the floating action of the floating element 3 is obtained by utilizing instead of the washer 5, some superimposed woven plastics discs. The aim is to obtain a small volume of air for enhancing the floating action using light materials.

Figure 2:
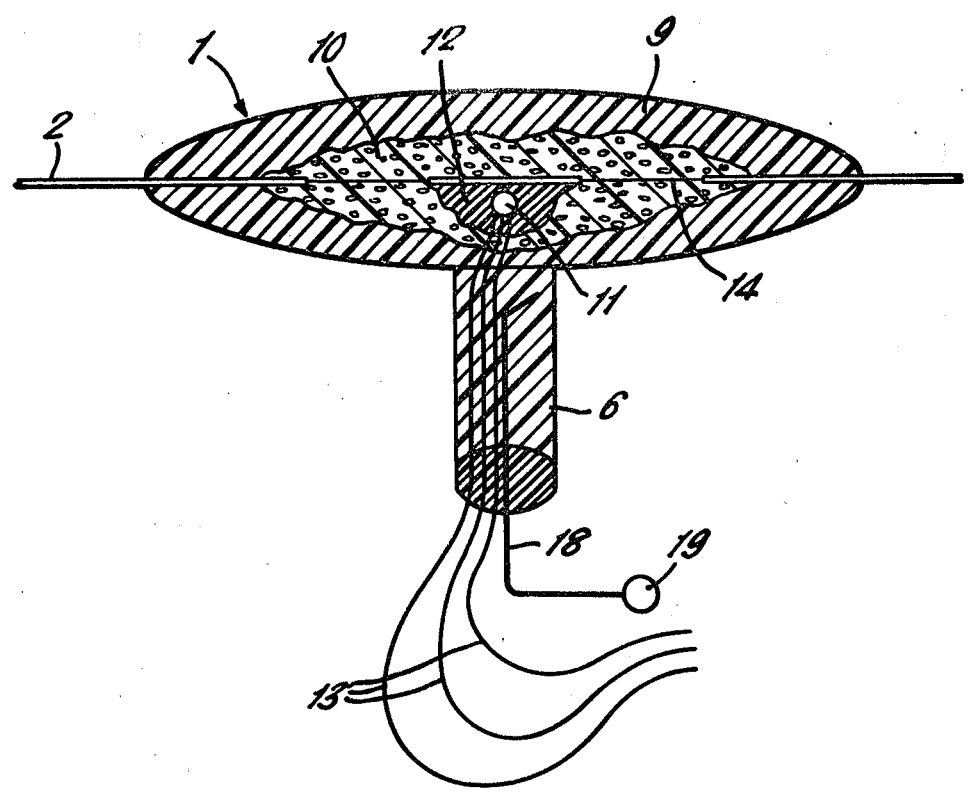
FIG. 2 shows a section through the central floating member of the detector of FIG. 1 taken along a vertical plane.
Figure 3:
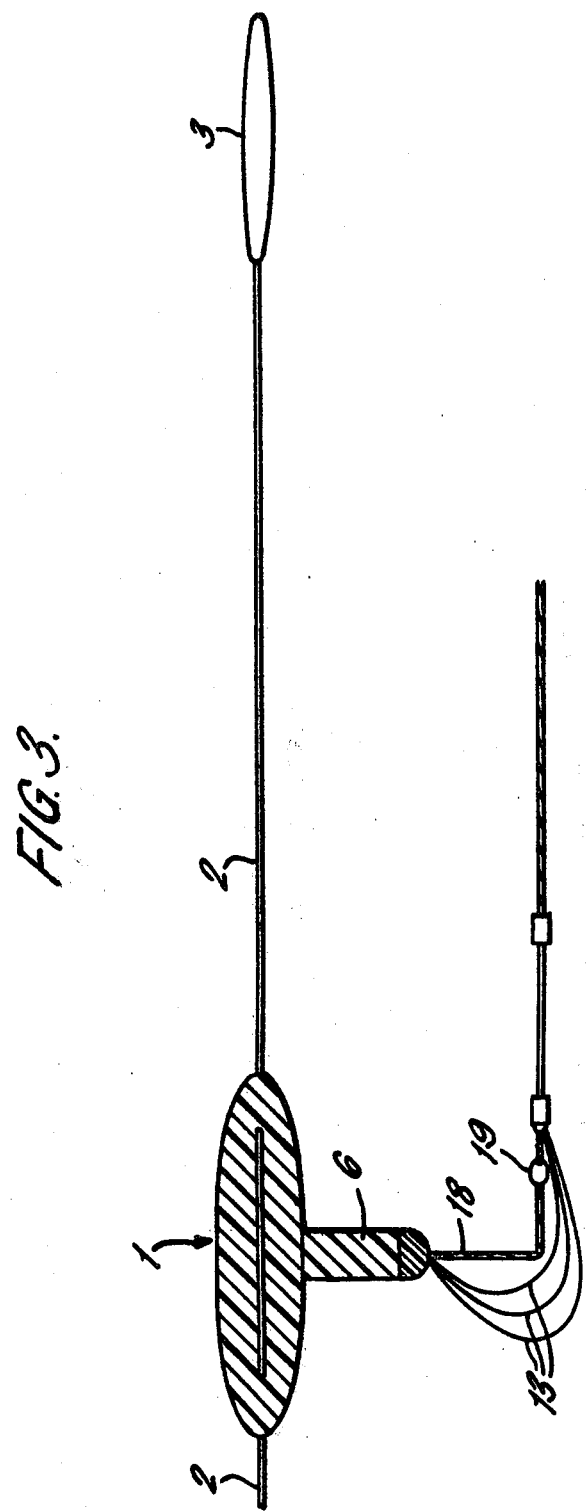
FIG. 3 is a lateral view of the central floating member of the detector of FIG. 1 with one arm and its peripheral floating element.

The body of the central floating member 1, whose vertical section is shown in FIG. 2, is composed of an external resin 9 and an internal insulating, expanded resin 10. The resin 9, which is externally metallized reflecting surface over all its surface and treated against fouling by biological material in the sea water, possesses a certain hardness and has a relative density of 0.6; whilst the internal resin 10 has a relative density of 0.3. The chosen densities are selected according to the desired degree of floating of the member 1. If we desire to lower its floating level, we may choose a resin with a greater density.

In the center of the volume of the central floating member 1 and internally of the insulating resin 10 is disposed a thermistance 11 (i.e. a thermoresistance or temperature responsive transducer such as a yellow Spring Instrument Co. (Ohio) Series 500, number 530 which is utilized in surgery and has a resistance of 7355 ohms at 0° c. and a range from $-40°$ c. to $+150°$ c.), covered by a thermoconducting resin 12. When desired, a detector for sensing the temperature of the air immediately above the superficial surface can be installed in the central floating member.

Below the floating member 1, a cylindrical appendage 6 is carried, providing increased stability to the whole apparatus. It is made of a resin and vertically crossed by electrical cables 13, connected to the thermistance, and by an Inox cable 18 bearing a ring 19 for the mechanical connection with the buoy (not shown). This connection is made by means of a nylon cable. When desired, a detector for sensing the temperature of water below the superficial surface can be installed in this appendage.

If we desire a preferential direction and a greater stability for the apparatus when following the drifting buoy, we can use, instead of a cylindrical appendage 6, a drift carrying the electrical and mechanical connections.

At the floating level of member 1, and diametrically opposed, four arms connect the four elements 3 horizontally with the interior of the floating member 1. Each arm (see FIG. 4) is constituted by a transparent double plastics blade 15 which is very thin, i.e. $8 \times 10^{-2}$ mm, and is composed of, for example, a sheet of polypropylene and polyethylene, peripherally soldered together. The length of each arm is about 171 mm and its width, which is 26 mm near the floating member 1, decreases slightly to 16 mm near the element 3.

Inside the sandwich constituting the exterior of arm 2, is placed a gold band 14, which is the thermal collector and is in contact with the thermistance 11 at one end and extends nearly to the floating element 3 at the other end. A band of coated paper 16 protects the gold band 14 in the region where it enters the floating member 1, preventing its breakage when subjected to wave action and also serving as a thermal insulator.

An aluminium band 17 is then superimposed on the paper band 16 and serves as a shield against the sun's rays.

The four extremities of the gold band 14, inside the floating member 1, are superimposed in its center and are soldered together and with the thermistance 11 by the thermoconducting resin 12.

Figure 5:
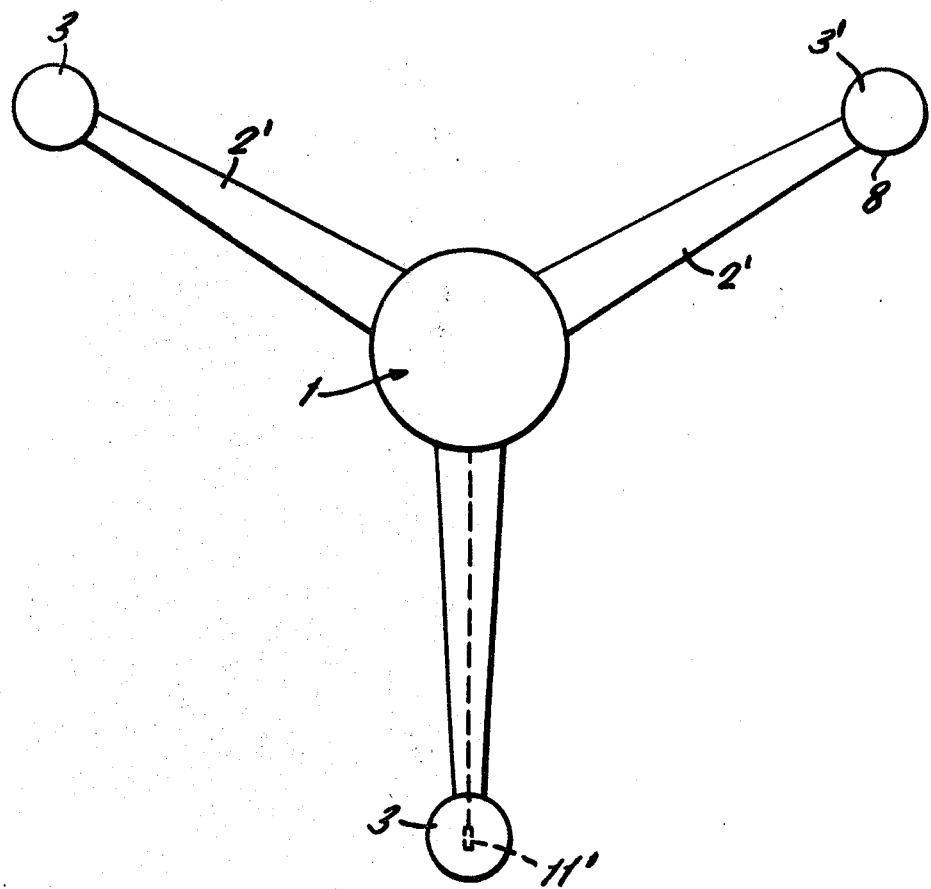
FIG. 5 shows another embodiment of the apparatus of the present invention.

In FIG. 5 is shown a variant of the present temperature detector. In this case, there are three arms 2′, and the thermoresistance 11′ is placed inside a peripheral floating element 3′, instead of in the central floating member 11 which contains now only the electrical connections with the buoy. The three arms 2′ and the peripheral elements 3′ are only for the purpose of floating and are constituted by plastics sandwiches enclosing small volumes of air in the manner previously described, e.g. with woven plastics washers and discs.

Variations on the exemplified embodiments are clearly possible. For example, in FIGS. 1 and 5, the apparatus is shown with four and three arms but a different number of arms may be conceived. Furthermore in FIG. 5 additional thermoresistances may be placed inside the peripheral floating elements other than the illustrated element 3, in order to be able to average out local temperature variations.

What is claimed is:

1. An apparatus for continuous and direct temperature measurement of an upper superficial layer of a water surface, which apparatus comprises:
   a central floating member;
   at least one peripheral floating element;
   at least one arm transversely connecting the central member to the at least one peripheral floating element corresponding thereto;
   at least one temperature sensor detector carried by the apparatus;
   a thermal collector disposed in the at least one arm for transmitting heat to the at least one temperature detector; and
   electrical means in the apparatus for transmission of temperature data from the at least one temperature detector,
   wherein the central member and the at least one peripheral floating element are adapted to maintain the apparatus on the water surface while at least a part of the at least one arm is in contact with and senses the upper superficial layer of the water.

2. An apparatus as claimed in claim 1 wherein the central floating member is constituted by an external rigid resin surrounding an expanded insulating resin which encloses a thermoconducting resin, in whose middle is disposed a thermoresistance (thermistance), wherein each resin's density is less than water's density, and wherein the floating member's external surface is metallized and treated against biofouling.

3. An apparatus as claimed in claim 1 wherein the at least one arm is formed from a double layer of flexible plastics foils peripherally soldered together, in whose inside are superimposed said thermal collector in the form of a gold band, a coated paper band and an aluminum band.

4. An apparatus as claimed in claim 1 wherein the at least one peripheral floating element is constituted by a double layer of flexible plastics discs peripherally soldered together and containing a plastics washer.

5. An apparatus as claimed in claim 1 wherein the at least one peripheral floating element is constituted by a double layer of flexible plastics discs peripherally soldered together and containing a woven plastics disc.

6. An apparatus as claimed in claim 1 including a drifting buoy and electrical means comprising electrical and mechanical connections between the central floating member and said drifting buoy, which connections pass below the apparatus, through a cylindrical body centered on the central floating member's lower part and to the buoy.

7. An apparatus as claimed in claim 6 wherein the body centered on the central floating member's lower part and carrying the electrical and mechanical connections is in the form of and operates as a drift.

8. An apparatus as claimed in claim 6 wherein the said cylindrical body carries a further temperature detector for sensing water below the said upper superficial layer.

9. An apparatus as claimed in claim 1 wherein the electrical means comprise equipment for transmission of temperature data.

10. An apparatus as claimed in claim 1 including means for sensing air temperature immediately above the water surface.

11. An apparatus as claimed in claim 1 wherein the at least one temperature detector is disposed in the at least one peripheral floating element.

12. An apparatus as claimed in claim 1 wherein the central floating element and the at least one arm are adapted to reflect incident sun rays.

* * * * *